United States Patent [19]

Spence-Bate

[11] 4,067,650
[45] Jan. 10, 1978

[54] DATA RECORDING MICROFORM CAMERA

[76] Inventor: Spence-Bate, 1 Cheam Place, Morley, Australia

[21] Appl. No.: 676,633

[22] Filed: Apr. 13, 1976

[30] Foreign Application Priority Data

Jan. 12, 1976 Australia .............................. 4504/76

[51] Int. Cl.² ...................... G03B 27/76; G03B 27/32; G03B 27/70
[52] U.S. Cl. ........................................ 355/20; 355/37; 355/46; 355/64; 355/66
[58] Field of Search ........................ 355/18, 20, 44, 45, 355/53, 64, 77, 46, 37; 353/28, 37; 354/110

[56] References Cited

U.S. PATENT DOCUMENTS

| | | | |
|---|---|---|---|
| 2,651,233 | 9/1953 | Tonoreau et al. ................... | 354/110 |
| 3,124,036 | 3/1964 | Hell et al. ............................ | 355/77 X |
| 3,459,888 | 8/1969 | Sokolov .............................. | 355/46 X |
| 3,608,452 | 9/1971 | Conrad et al. ...................... | 355/20 |
| 3,688,654 | 9/1972 | Nielsen .............................. | 353/37 X |
| 3,715,962 | 2/1973 | Yost ................................... | 355/37 X |
| 3,796,487 | 3/1974 | Voorhees ........................... | 355/20 X |
| 3,872,462 | 3/1975 | Lemelson ........................ | 355/18 UX |
| 3,891,315 | 6/1975 | Kolibas .............................. | 355/66 X |

FOREIGN PATENT DOCUMENTS 930,355  7/1963  United Kingdom ................... 353/37

Primary Examiner—Donald A. Griffin
Attorney, Agent, or Firm—Fidelman, Wolffe & Waldron

[57] ABSTRACT

A microform data acquisition processing and storage system in which data is fed from a computer, tape or cards to a cathode ray tube from whence an image produced on the tube is projected onto a photographic film or alternatively by means of an optical switching device an image of a document located on a document platen within the apparatus can be projected on to the same film without changing the film; the cathode ray tube is provided with a coating having a spectral peak between 500 and 600 nm so as to match the spectral peak of the image on the platen.

15 Claims, 5 Drawing Figures

DATA RECORDING MICROFORM CAMERA

The present invention relates to microform data acquisition, processing and storage systems, the term microform indicating microfilm or microfiche or other micrographic recording media.

Various sytems have been proposed whereby data stored in computer memories is converted into alphanumerics and then displayed on a cathode ray tube and the data, there displayed, is then fed optically through optical lenses to photographic recording media. Suitably such data is recorded in as small a form as possible, consistent with the required degree of quality in reproduction so as to enable large amounts of data to be recorded on as small an area of film as possible.

In order that the fullest use may be made of the microform film it is essential for the cathode ray tube from which the film image is to be recorded to have a phosphor coating which can produce a high resolution. Further improvement in resolution has been achieved by making the tube face as large as possible and reducing the image optically. Also the coating of the tube must be compatible with the fine granular structure of the recording film which is normally silver halide film. Such high resolution tubes in known systems use a blue phosphor coating compatible with a blue sensitive film. In the requirement to mix tube recorded data with data recorded from documents directly by means of conventional techniques it would therefore be necessary from the actinic point of view to change the film since conventional document photography uses the yellow/green area of the spectrum.

It is therefore proposed in accordance with the invention to provide a data recording microform camera including a high resolution camera cathode ray tube having a tube coating sensitive to a light source of between 500 and 600 nm, first optical means for transferring an image produced on the tube onto a photographic film held on a carrier in said camera, second optical means for transferring an image held on a document recording platen onto said film, and means for switching the exposure of the film from the first to the second optical means whereby the camera can record on the same film data from the cathode ray tube or the image on the document recording platen.

The camera preferably incorporates means for accepting data from an on-line computer or other sources feeding the data from magnetic tape, punched tape or punched cards. For purposes of updating, checking, editing or the like, is is of advantage or even a necessity to be able to monitor the data appearing on the camera cathode ray tube. A direct camera read-off by mirrors or the like, even if enlargement is employed, is not practicable, for to accommodate, for example, 64 rows of data on an external visual display unit (hereinafter called a V.D.U.) in an easily eye-readable form constitutes a considerable size problem.

In order to reduce the size of the monitor V.D.U. tube while keeping character dimensions constant, at easily eye-readable levels, all data is advantageously first put into a temporary store and the relevant parts, that is to say those sections which need to be checked or processed, are displayed on the V.D.U. tube by means of a roll-up or roll-down technique. On the other hand conventional documents which need to be recorded are by definition already in eye-readable form and may be inspected on the document platen.

The camera tube coating is preferably a zinc, cadmium sulphide phosphor compound with a silver activating element having a spectral peak in the 525–580 nm range. Alternatively a zinc sulphide phosphor compound with a copper activating element having a similar spectral peak may be used. The advantage of using such coatings is that whereas phosphors in the blue range (approximately 425 to 485 nm) require a camera exposure of up to 10 seconds the 500 to 600 nm range of coatings with a 525–580 nm peak may only require an exposure of 100 milliseconds or less. Thus, the speed of camera operation is greatly increased and this makes combined conventional and computer fed photography possible.

The invention will now be described in detail with reference to the accompanying drawings in which.

Figure 1:
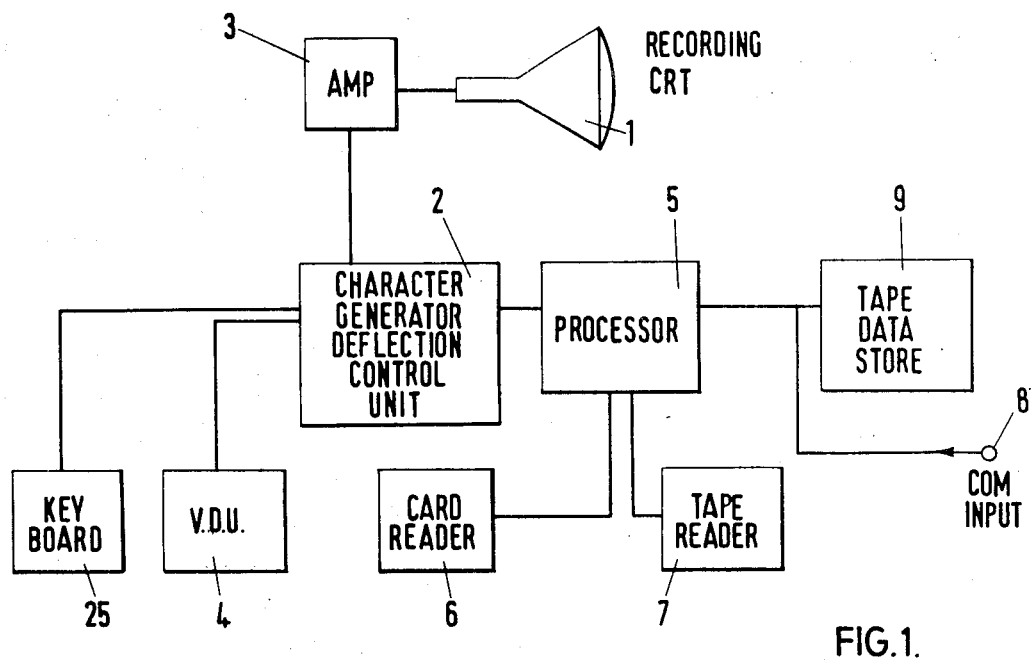
FIG. 1 shows a block diagram of the electronic inputs for the recording cathode ray tube for the camera according to the invention.

In FIG. 1 there is shown the electronic arrangements for a microform data storage camera having a recording cathode ray tube 1 fed from a character generator and deflection control unit 2 via a power supply and deflection amplifier 3. Connected to the character generator and deflection control unit 2 is a visual display unit 4 and a processor 5. Connected to the processor are firstly a card reader 6 with the alternative of a tape reader 7 and a main computer input 8. Also connected to the processor is a tape data store 9. An input to the processor can be any one or combination of the readers 6 or 7 or input 8.

Figure 2:
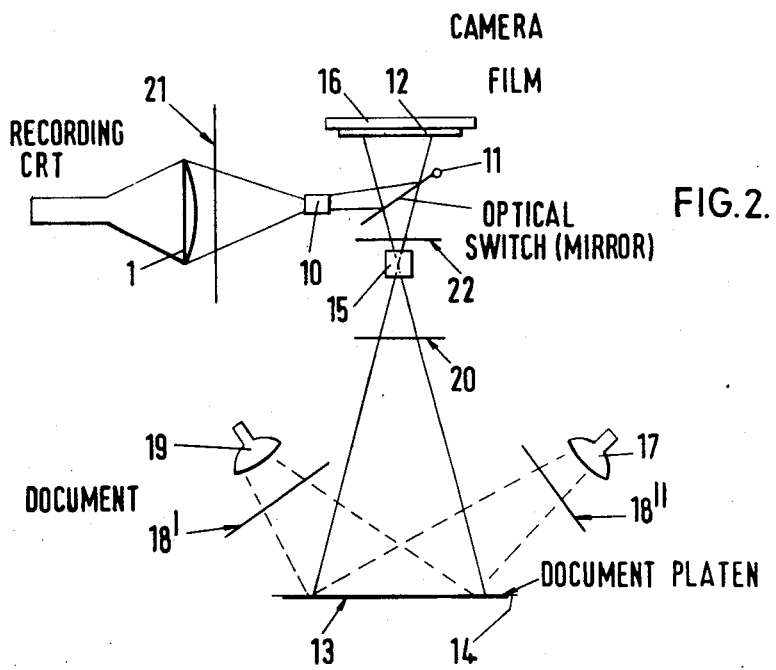
FIGS. 2 and 3 are diagrammatic representations of the optical arrangements of cameras according to the invention.

In FIG. 2 the general optical arrangement of the camera is shown in which the camera recording cathode ray tube 1 projects an image via a first optical means 10 and an optical switch means 11 which is suitably a mirror to a photographic film 12. Alternatively the image of a document 13 on a document recording platen 14 may be transferred via a second optical means or lens arrangement 15 to the photographic film 12 held on a film carrier 16 in the camera. The document platen 14 is illuminated by a light source 17 having if required a filter 18 to suppress unwanted spectral lines. Infra-red light may be supplied from a supplementary light source 19 for illuminating documents 13.

The film 12 suitable for use in the camera is designed to be sensitive in the 500 to 600 nm range with peak sensitivity at about 540 and 580 nm in the green and yellow spectral bands.

In order to complement the spectral sensitivity of the photographic film the recording tube 1 has a phosphorous screen coating in the yellow/green range with a medium persistance. Suitable tube coatings on the tube screen are zinc, cadmium, sulphide phosphor with a silver activating element or zinc, sulphide phosphor with a copper activating element. The camera tube is a high resolution tube suitable for exposure times of approximately 100 milliseconds and is capable of displaying 8448 alphanumeric characters in a 132 by 64 lines arrangement.

In order to reduce the size of the V.D.U. tube a roll-up/roll-down facility is provided by storing all of the data received from the input 8 in the tape data store 9. Part of the data received is then extracted from the store 9, normally 25 lines out of the full 64 lines of data being extracted. The remaining 39 lines of data remains in the store. When first 25 lines has been monitored, the first 19 lines are cancelled on the V.D.U. tube, the remaining 6 lines displayed at the top of the tube and 19 fresh lines (lines 26 to 44) then extracted from the store for display. As these new lines are monitored lines 20 to 39 are cancelled, lines 45 to 64 are extracted from the store and the final lines 40 to 64 are then displayed on the V.D.U. tube. As required data can be back checked and displayed, for instance lines 25 to 50 might be required.

In order to make the V.D.U. tube more easily eye-readable a display time of 0.02 secs is used that is to say at a refresh rate of 50 frames per second. Since 25 lines of data at 132 characters per line (equals 3300 characters) have to be displayed and read from the store 9 the data reading rate is 165,000 characters per second or 1,320,000 bits per second (i.e. 8 bits per charater). In the event of a requirement to read the full 64 lines 3,379,200 bits would have to be read per second (i.e. 1 character in 2.37 microsecs) which is beyond the capability of known available equipment. To write a character within this limitation of 2.37 microsecs is also beyond the capability of known equipment. Thus the advantage of the roll-up/roll-down technique will be readily apparent.

As regards the data displayed on the camera tube a display time of 0.2 seconds is used for the full 8448 characters (132 × 64 lines) and for this a rate of reading from the store 9 is 42,240 characters per second or 337920 bits per second which is 1/10 of the speed of the V.D.U. tube. Although flicker occurs at this rate where the frame refresh rate is only 5 frames per second this does not matter since an exposure time of only about 0.1 second is required using yellow/green sensitive film.

The data displayed for photographic recording on the camera tube is via the data store 9 and is as received from the computer input or else as corrected or updated by a key board 25 associated with the V.D.U., the data in the data store 9 being modified by the key board input.

The processor 5 can select high definition character fonts which are generated by the character generator 2. Suitably a font formed from a 7 by 9 dot matrix of a known form is generated by the character generator 2. But if other fonts are required these can be programmed into the character generator and selected as required.

The visual display unit 4 monitors the information recorded on the recording tube 1 and this enables the camera operator to check the information recorded and as required changed or modified the information via the card reader 6 or tape reader 7. Meanwhile information may be fed from the computer input 8 as required.

Figure 3:
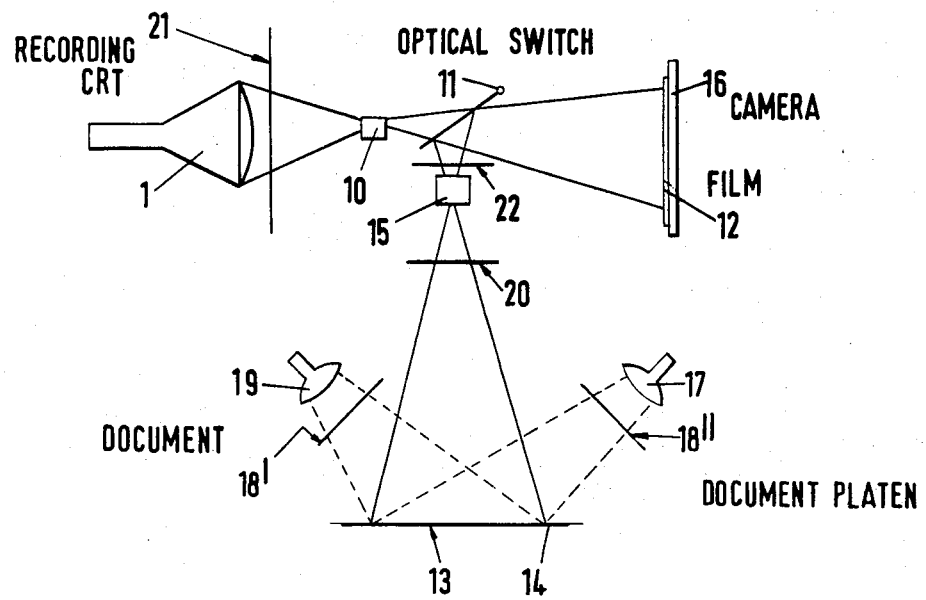

To improve the reproduction of coloured documents or when recording documents such as old parchment records where the colour conditions of the record are difficult, colour correction may be needed. In FIGS. 2 and 3 filters 18′ and 18″ change the spectral composition of the light emitted from the sources 17, 17′ or 19, 19′. Additional filters 20 and 22 can be can be provided as correcting stages for the light reflected from the record on the document platen. Filters 20 and 22 can be arranged as a plurality of filters in an array in the manner of waterhouse stops or in a strip arrangement. A further filter or overlay 21 can be provided for the camera recording tube.

Figure 4:
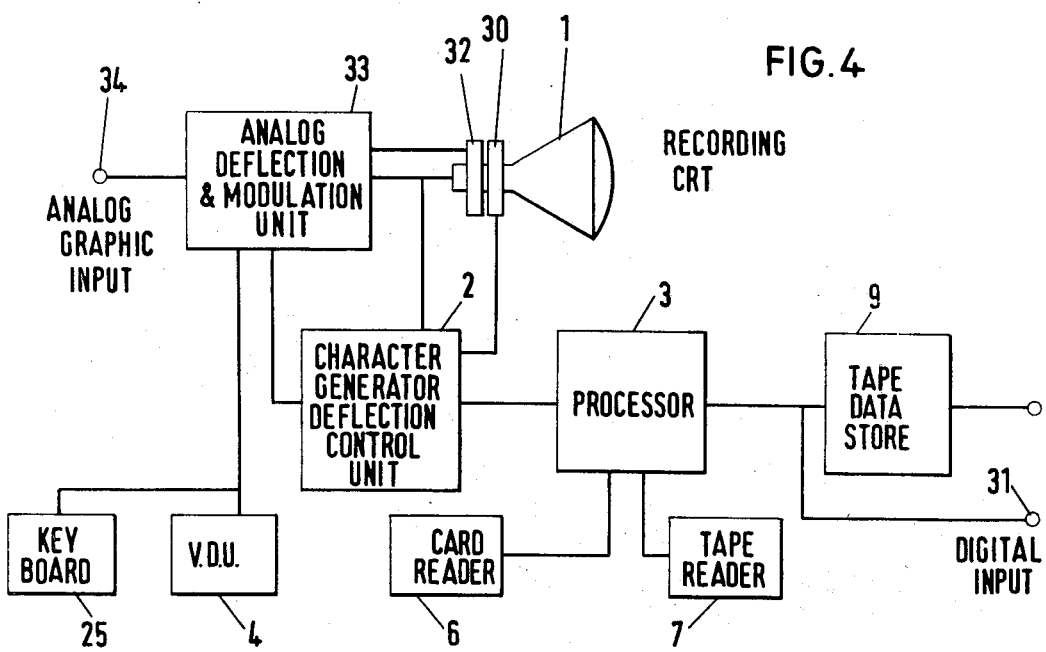
FIG. 4 is a block diagram of an alternative arrangement to FIG. 1.

Two forms of graphic display can be included separately or together. Graphics are displayed on the V.D.U. tube and camera tube by the inclusion of a digital to analogue converter in the deflection control unit 2. This enables pictures to be reconstructed which have been digitalized and stored in digital form. Alternatively a system can be provided as shown in FIG. 4 with a dual deflection system. One set of deflection coils 30 on the camera or recording C.R.T. is connected to the deflection control unit 2 for control from a digital input 31. Another set of deflection coils 32 on the camera tube 1 is connected to an analogue deflection and modulation unit 33 for control from an analogue graphic input 34.

Figure 5:
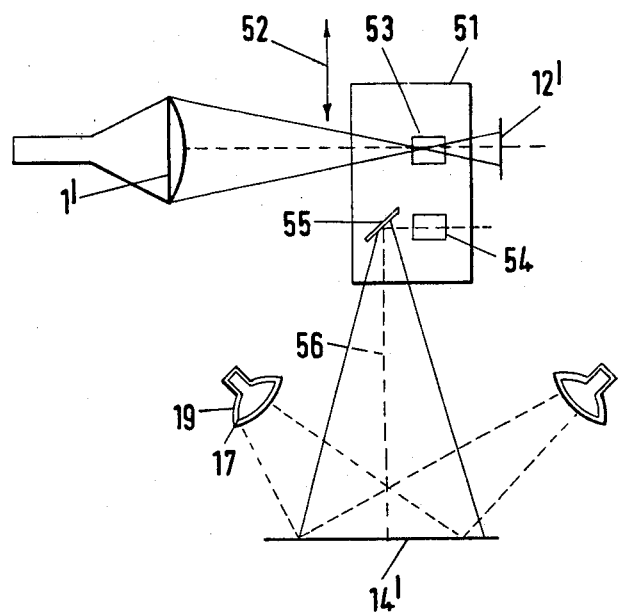
FIG. 5 is a diagrammatic representation of a further optical arrangement of a camera according to the invention.

In FIG. 5 a further optical arrangement is shown in which the optical switch means in FIG. 5 a further optical arrangement is shown in which the optical switch means is changed from the shifting mirror arrangement of FIGS. 2 and 3 and a slide 51 substituted instead. The slide 51 is adapted for movement in a direction 52 either towards or away from the document platen 14′ and mounted to the slide is a recording cathode ray tube lens 53 and a document lens 54 associated with a mirror 55 which deflects the optical path 56 on a photographic film 12′ mounted on a suitable film carrier within the camera. The operation of the slide 51 is such that an image can be recorded on the film 12′ either from the cathode ray tube 1′ when the slide is in the position shown in FIG. 5 or else by shifting the slide 51 upwards in the direction 52 documents can be recorded on the film 12′ from the document platen 14.

The arrangement of FIG. 5 specifically shows in a diagrammatic form a slide 51 but if required a turret can be substituted for the slide and the lenses 53 and 54 together with the deflecting mirror 55 can be mounted on the turrent in a known manner.

I claim:

1. A data recording microfilm apparatus comprising in combination:

a photographic microfilm holding means, a camera cathode ray tube arranged to project an image through a first optical means onto a film held on said holding means, the face of said camera cathode ray tube completely coated with a tube coating having a spectral peak between 500 and 600 nm and said film being prodominently sensitive to a light source of between 500 and 600 nm, means for feeding data to said cathode ray tube to form said image, optical switching means between said first optical means and film holding means, a document recording platen illuminated by a light source, said light source producing a spectral peak of an image on said platen of between 500 and 600 nm, and a second optical means between said switching means and said platen arranged to project an image on said platen through said switching means to a film held on said means, whereby images for recording on the microfilm may be selected from either the camera tube or a document on the document platen without changing the film.

2. An apparatus as claimed in claim 1 wherein there is provided means for accepting data from an on-line computer and means for transferring the data to the camera cathode ray tube.

3. An apparatus as claimed in claim 1 wherein there is connected to the camera cathode ray tube a visual display unit having an eye-readable further cathode ray tube, whereby data displayed on the camera cathode ray tube can be monitored on the visual display unit tube.

4. An apparatus as claimed in claim 3 wherein a data store is connected to the visual display unit so that a part of the data displayed on the camera tube may be stored temporarily while the remaining part of the data displayed on the camera tube may be displayed on the visual display unit tube.

5. An apparatus as claimed in claim 4 wherein the visual display unit is provided with a key board arranged to correct or feed additional data to the camera tube.

6. An apparatus as claimed in claim 4 wherein at least half of the data displayed on the camera tube is stored in the data store while the remaining part is displayed on the visual display unit tube.

7. An apparatus as claimed in claim 4 wherein the display time of data on the visual display unit tube is in the order of 0.02 seconds.

8. An apparatus as claimed in claim 1 wherein the camera tube is coated with a zinc, cadmium sulphide compound with a silver activating element having a spectral peak in the 525-580 nm range.

9. An apparatus as claimed in claim 1 wherein the camera tube is coated with a zinc, sulphide phosphor compound with a copper activating element having a spectral peak in the 525-580 nm range.

10. An apparatus as claimed in claim 1 wherein filters are provided to correct the spectral composition of light received by the first or second optical means.

11. An apparatus as claimed in claim 10 wherein a further filter is provided between the second optical means and the means for switching the exposure of the film.

12. An apparatus as claimed in claim 1 wherein an overlay is provided between the camera tube and the first optical means.

13. An apparatus as claimed in claim 1 wherein the camera cathode ray tube is provided with deflection control means arranged to be controlled from a digital input and a further deflection control means arranged to be controlled from an analogue input.

14. An apparatus as claimed in claim 1 wherein a digital to analogue converter is provided in the input to the camera cathode ray tube.

15. An apparatus as claimed in claim 1 wherein the display time of data on the camera tube is in the order of 0.02 seconds.

* * * * *

UNITED STATES PATENT OFFICE
CERTIFICATE OF CORRECTION

Patent No. 4067650                    Dated January 10, 1978

Inventor(s) Harry Arthur Hele Spence-Bate

It is certified that error appears in the above-identified patent and that said Letters Patent are hereby corrected as shown below:

[76] Inventor: Harry Arthur Hele Spence-Bate,
1 Cheam Place, Morley, Western Australia Signed and Sealed this Twenty-third Day of May 1978

[SEAL]

Attest:

RUTH C. MASON            LUTRELLE F. PARKER
Attesting Officer    Acting Commissioner of Patents and Trademarks